O. A. OSMONSON.
COMBINED BEVEL AND SQUARE.
APPLICATION FILED APR. 14, 1908.
912,605.
Patented Feb. 16, 1909.
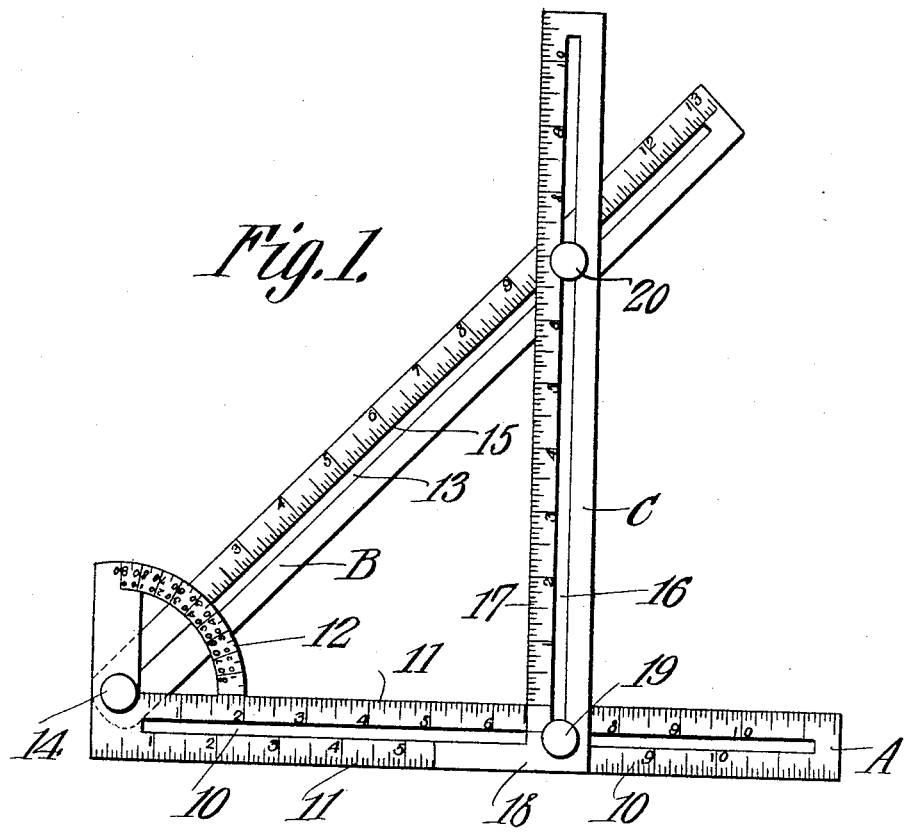
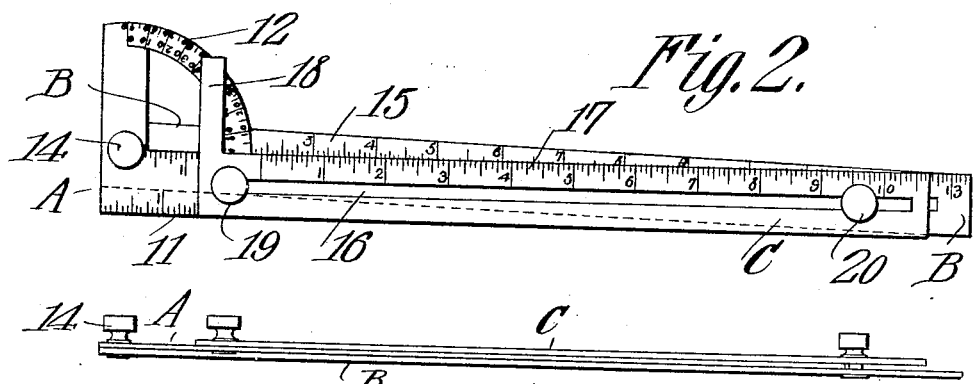
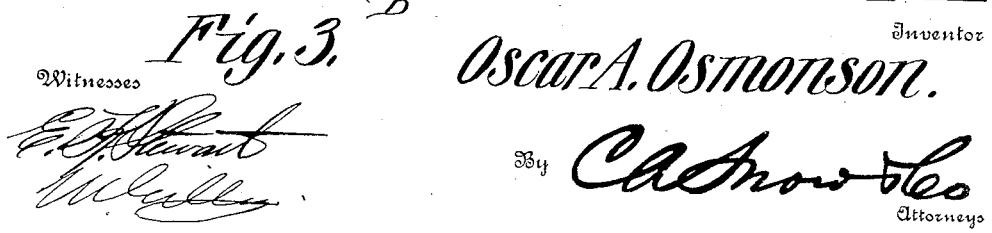
Witnesses
Inventor
Oscar A. Osmonson.
By C. A. Snow & Co
Attorneys

UNITED STATES PATENT OFFICE.

OSCAR A. OSMONSON, OF CROOKSTON, MINNESOTA.

COMBINED BEVEL AND SQUARE.

No. 912,605.  Specification of Letters Patent.  Patented Feb. 16, 1909.

Application filed April 14, 1908. Serial No. 427,025.

*To all whom it may concern:*

Be it known that I, OSCAR A. OSMONSON, a citizen of the United States, residing at Crookston, in the county of Polk and State of Minnesota, have invented a new and useful Combined Bevel and Square, of which the following is a specification.

This invention relates to measuring tools and more especially to that class of measuring instruments designed to lay out leather in squares.

This invention consists in an improved form of three part bevel and square provided with a quadrant at one end thereof arranged so that the angle of one of the parts may be established relative to the other.

The invention consists further in certain arrangements of parts and combinations of the details hereinafter to be described, illustrated in the accompanying drawings, and specifically set forth in the claims.

In the accompanying drawings like characters of reference indicate like parts throughout the several views and Figure 1 is a plan view of the device as arranged for laying out a forty-five degree bevel. Fig. 2 is a view of the device folded for putting away, Fig. 3 is an edge view of Fig. 2.

The device consists of three distinct members. For reference these three members will be designated by the letters A, B and C shown in Fig. 1. The member A forms the main member of the device. This member is provided with a longitudinal slot therein, as indicated by the numeral 10. The exterior of this slot and on both sides thereof is formed a suitable scale 11. At one end of the member A there is formed a quadrant 12 having a suitable scale of degrees arranged thereon. The member B is pivotally attached to the member A, the center of the pivot being at the zero point of the scale 11 of the member A which lies adjacent the quadrant. The member B is provided with a slot 13 similar to the slot 10 of the member A. One edge of this slot is arranged to lie radially to the pivotal center. A thumb screw 14 is held to form the pivot of these two members. The member B is provided with a scale 15 thereon so arranged that the edge of the scale lies on the edge of the slot 13. The scale 15 will always be radial to the pivot 14. The third member C is provided with a slot 16 similar to the slots 10 and 13 of said members. In addition the member C is provided with a scale along one edge thereof as indicated by the numeral 17. This scale is so arranged that when the parts are in the position shown in Fig. 1, that is to say, when the member C is at right angles to the member A, the scale 17 will have its zero in alinement with the radial scale 11 on the member A. The member C is further provided with an extension 18 at right angles to the body of the member and so arranged that when the parts are in the position shown in Fig. 1 the edge of the projection or extension 18 will coincide with the edge of the member A as shown in that figure. A thumb nut 19 serves to connect the members A and C pivotally and slidably. A similar thumb nut 20 serves to connect in like manner the members B and C.

In Fig. 1 the device is shown as arranged to lay off an angle of forty-five degrees. It will be noted that when the parts are thus positioned the projection 18 will be in such relation to the member A that a pencil or scriber may be drawn along the edge of that member without interruption or obstruction. It will be noted that the scale on the quadrant 12 affords a ready means for laying out any desired angle. It is further to be noted that by reason of one of the scales on 11 and the scale on 15 being radial it is possible with the aid of the member C to lay out other angles, this being due to the value of the scales as thus arranged. As an example of this, it may be stated that if the zero point of the scale 17 be brought to coincide with the fixed point on the scale 11 on the upper edge of the member A, and the eighth point on the scale 17 be brought to coincide with the ten point on the scale 15, the members C and A will be at right angles. Another example may be cited. If the ten point of the scale 15 is brought to coincide with the five point of the scale 17 and the edge of the extension 18 be brought to coincide with the edge of the member A the members B and A will be at an angle of thirty degrees to each other.

What is claimed is:—

1. In a device of the character described, an arm bearing a quadrant and having a scale arranged thereon, a second arm pivotally connected thereto and a third arm pivotally and slidably connected to the first and second arms and having a rigidly attached lateral projection at right angles to the body arranged for alinement with the edge of the first arm when said first and third arms are in rectangular position.

2. In a device of the character described, an arm bearing a quadrant and having a scale arranged thereon, a second arm pivotally connected thereto, and a third arm pivotally and slidably connected to the first and second arms, and having a rigidly attached lateral projection at right angles to the body arranged for alinement with the edge of the first arm when said first and third arms are in rectangular position and means for locking any two of said arms in adjusted relation.

3. In a device of the character described, an arm bearing a quadrant at one end thereof, said arm being provided with a scale having a zero point at the center of the quadrant, a second arm pivoted at the center of the quadrant having a similar scale, and a third arm pivotally and slidably connected to the first and second arms having the zero point at the line of the first mentioned scale, and having a rigidly attached lateral projection at right angles to the body arranged for alinement with the edge of the first arm when said first and third arms are in rectangular position.

4. In a device of the character described, an arm bearing a quadrant at one end thereof, said arm being provided with a scale having the zero point at the center of the quadrant, a second arm pivoted at the center of the quadrant having a similar scale, and a third arm pivotally and slidably connected having a scale arranged on the same having the zero point at the line of the first mentioned scale when the first and third arms are at right angles and a rigidly attached lateral projection at right angles to the body arranged for alinement with the edge of the first arm when said first and third arms are in rectangular position.

5. In a device of the character described, an arm bearing a quadrant at one end thereof, said arm being provided with a scale having the zero point at the center of the quadrant, a second arm pivoted at the center of the quadrant of the scale and a third arm having a lateral projection rigidly attached to the body arranged for alinement with the edge of the first arm when said first and third arms are in rectangular position pivotally and slidably connected to the first and second arms having a scale arranged thereon having the zero point at the line of the first mentioned scale when the first and third arms are at right angles, and means to lock said arms in the desired relation.

In testimony that I claim the foregoing as my own, I have hereto affixed my signature in the presence of two witnesses.

OSCAR A. OSMONSON.

Witnesses:
GEO. T. HAMERY,
THEO. MYERS.